Patented Mar. 18, 1941

2,234,958

UNITED STATES PATENT OFFICE 2,234,958

ESTERS AND METHOD OF PRODUCING THE SAME

Theodore F. Bradley, Stamford, and William B. Johnston, Springdale, Conn., assignors to American Cyanamid Company, New York, N. Y., a corporation of Maine No Drawing. Application November 26, 1938, Serial No. 242,556

20 Claims. (Cl. 260—75)

This invention relates to mixed esters and to methods of producing the same. It is particularly concerned with esters which may be described as esters of non-conjugated terpene-fumaric acid complexes, and methods of producing the same.

This application is a continuation in part of our copending application Serial No. 215,584, entitled "Esters and methods of producing the same," filed June 24, 1938.

It is known that maleic anhydride will react with both conjugated and with non-conjugated terpenes upon heating mixtures thereof at temperatures variously ranging from 40° C. to 220° C. Such reactions generally result in the production of various unsaturated dibasic acid anhydrides of liquid, or less frequently crystalline or amorphous solid forms, together with lesser amounts of more complex resinous acid anhydrides of higher molecular weight and of higher degrees of polybasicity. In the production of these acid anhydrides according to the usual processes, we have found that the ratio of dibasic to the more polybasic fractions will vary according to the constitution and proportion of the terpene fractions employed and according to the reaction conditions, especially the temperature.

While some of the complex mixtures of acid anhydrides of this maleic-terpene prior art have been esterified for the production of alkyd resins and other esters, their use for many purposes, is somewhat limited because of their inherent defects. We have found, for example, that at elevated temperatures, including the range in which alkyd poly-esters are normally prepared, certain of these acid anhydrides undergo decomposition, frequently with loss of carbon dioxide and other volatile matter and in some cases with more drastic decomposition into volatile hydrocarbons and succinic anhydride.

It has been suggested that certain of these objections may be overcome by the fractional vacuum distillation of the mixture of complex acid anhydrides of these terpene-maleic anhydride reactions, during which the dibasic constituents are isolated and may thereafter be separately esterified. This necessarily creates a large amount of by-product for which some disposition must be found and increases the cost of the desired product to a substantial extent.

In the various processes described for the production of reaction products of non-conjugated terpenes and maleic anhydride by heating mixtures of the same, it has frequently been stated that fumaric acid may be substituted for the maleic anhydride and equivalent results obtained. We have found the contrary to be true. We have found that mixtures of fumaric acid and non-conjugated terpenes are substantially unreactive throughout the suggested temperature ranges. Using suggested reaction conditions, even for long periods of time, we have found that fumaric acid does not combine chemically with non-conjugated terpenes such as alpha and beta pinenes, limonene, dipentene and terpinolene. In some cases, where commercial grades of the non-conjugated terpenes were used, reaction to the extent of 10 per cent or less may be obtained but in such instances the slight reaction is due to the presence of small amounts of conjugated terpenes and possibly other impurities. Where these impurities are previously removed as by pretreatment with a small amount of maleic anhydride, the same lack of reaction with fumaric acid is observed. In other words, we have found that fumaric acid does not react with the non-conjugated terpenes under the conditions described as suitable for maleic anhydride and alleged to be suitable for fumaric acid.

These statements of the equivalency of fumaric and maleic acids are apparently based on the assumption that fumaric acid is allegedly converted to maleic anhydride at elevated temperatures. However, we have found that upon heating fumaric acid for eleven hours at 200° C., no detectable amount of maleic acid or anhydride is formed. Likewise, upon heating fumaric acid at 250° C. for eleven hours, the fumaric acid is partially decomposed with evolution of carbon dioxide and less than 0.25 per cent of maleic acid is formed. Since these temperatures are above those generally suggested for reaction with the terpenes, the alleged rearrangement of fumaric acid to maleic anhydride or maleic acid could not be substantiated.

Maleic anhydride reacts exothermically with conjugated terpenes and these reactions may be brought about at temperatures even below 100° C. Maleic anhydride combines quickly and readily with non-conjugated terpenes at the reflux temperature of 170°-180° C. The results obtained when fumaric acid is heated with terpenes, are quite different. Fumaric acid will combine slowly with conjugated terpenes such as laevo alpha phellandrene or Δ 3,8 (9) para menthadiene by refluxing mixtures of the same at 170°-190° C. for several hours. The resulting products are resinous acids differing in many respects from the corresponding maleic anhydride reaction products.

One of the objects of the present invention is to provide a means whereby the inactivity of fumaric acid toward the non-conjugated terpene hydrocarbons may be overcome and thus an entirely new and useful series of derivatives made available for industrial purposes.

It is another object of the present invention to provide a process by which the materials employed may be readily and efficiently reacted to produce directly an alkyd-poly-ester mixture relatively free from undesirable polybasic components.

These and other objects are attained by causing the fumaric acid to combine chemically with non-conjugated terpenes of the $C_{10}H_{16}$ series, using solubilizing and reactive alcohols to produce esters of complex organic acids which are formed during reactions that apparently involve the unsaturation of both the terpene and the fumaric acid and are produced solely as esterified derivatives by our methods as hereinafter described. We have found that if fumaric acid be admixed with an alcohol and one or more non-conjugated terpenes of the $C_{10}H_{16}$ group and the mixture be caused to react simultaneously, there results chemical interaction of the fumaric acid, terpene, and alcohol, and esters of relatively low acid number are formed in high yields without objectionable side reactions or decompositions.

The principles and practice of our invention will be more clearly understood by reference to the examples given by way of illustration and not in limitation. In each of the following examples, the stipulated amounts of non-conjugated terpenes, alcohols and fumaric acid are placed in a suitable reaction vessel, and said vessel may be advantageously equipped with an efficient mechanical agitating device, a thermometer well and a side arm to which is attached a reflux condenser and a water trap. Agitation is commenced in each case shortly after heating is begun and catalysts are introduced at this point in those examples where catalysts are employed. The temperature of each reaction mixture is held continuously at the reflux point so that the excess of unreacted terpene and the water of esterification are distilled together, condensed and separated, and the separated terpene is returned to the reaction mixture. In general, the reaction mixture is heated to about 170° C. and is then gradually increased to from 180° C. to 210° C.

The exact temperatures used in each specific case, however, are initially subject to the boiling points of the reacting materials and gradually increase as the water of esterification is eliminated. In all cases the reaction mixtures are best refluxed until substantially all water evolution has ceased. Following this, the excess or unreacted terpene is removed under reduced pressure and the resulting esters are recovered for subsequent use.

*Example 1*

| | Parts by weight |
|---|---|
| Dipentene | 200 |
| Fumaric acid | 155 |
| Triethylene glycol | 200 |

Reaction of this mixture under the general conditions as described, for a period of 9 hours in which the temperature of the reaction mixture averages 180° C., results in the recovery of 45 parts by weight of aqueous distillate, 118 parts by weight of uncombined terpene and about 392 parts by weight of a viscous, balsam-like poly-ester having an acid number of 40.

*Example 2*

| | Parts by weight |
|---|---|
| Dipentene | 400 |
| Fumaric acid | 77.5 |
| Triethylene glycol | 100 |

Under the aforesaid conditions, after a reflux period of 6½ hours, there is obtained 21.3 parts of aqueous distillate, 329 parts of uncombined terpene and about 227 parts of a viscous, balsam-like poly-ester having an acid number of 35.6.

*Example 3*

| | Parts by weight |
|---|---|
| Dipentene | 200 |
| Fumaric acid | 155 |
| Triethylene glycol | 200 |
| Stannic chloride | 5 |

This mixture (corresponding to Example 1 except for the added catalyst) is found to react more vigorously so that during refluxing, the temperature rises to 200° C. and in two hours there are obtained 47.5 parts of aqueous distillate, 69 parts uncombined terpene and about 443 parts of a viscous, balsam-like poly-ester having an acid number of 24.6.

*Example 4*

Repetition of Example 3 using 5 parts of anhydrous zinc chloride in place of stannic chloride yields, after refluxing for 4 hours at 180°–200° C., 45 parts of aqueous distillate, 52 parts of uncombined terpene and about 463 parts of a viscous poly-ester having an acid number of 48. Aluminum and ferric chlorides, zinc bromide and zinc iodide are all found to act as catalysts under comparable conditions.

*Example 5*

Repetition of Example 3 using 5 parts of iodine in place of stannic chloride yields, after refluxing for 4 hours at 180°–210° C., 45 parts of aqueous distillate, 54 parts of uncombined terpene and about 461 parts of a balsam-like poly-ester having an acid number of 55.2.

*Example 6*

| | Parts by weight |
|---|---|
| Dipentene | 300 |
| Fumaric acid | 155 |
| Triethylene glycol | 200 |
| Iodine | 5 |

After 5 hours refluxing at 180°–200° C., there are obtained from this reaction 45 parts of aqueous distillate, 116 parts of uncombined terpene and about 499 parts of a balsam-like poly-ester having an acid number of 61.5.

*Example 7*

| | Parts by weight |
|---|---|
| Dipentene | 250 |
| Fumaric acid | 78 |
| Triethylene glycol | 100 |
| Glycerol | 11 |
| Linseed fatty acids | 93 |
| Stannic chloride | 1.2 |

After 6 hours of refluxing at 180–190° C., there are recovered 33 parts of aqueous distillate, 162 parts of uncombined terpene and about 338 parts of an oxygen-convertible, balsam-like poly-ester having an acid number of 18.

Example 8

| | Parts by weight |
|---|---|
| Dipentene | 125 |
| Fumaric acid | 78 |
| Triethylene glycol | 100 |
| Linseed oil | 98 |
| Stannic chloride | 1.2 |

After 5½ hours of refluxing while the temperature is gradually raised from 170° C. to a maximum of 230° C., there are obtained 24 parts of aqueous distillate, 35 parts of uncombined terpene and about 345 parts of an oxygen-convertible, balsam-like poly-ester having an acid number of 9.8.

Example 9

| | Parts by weight |
|---|---|
| Dipentene | 182 |
| Fumaric acid | 116 |
| Ethylene glycol | 62 |
| Linseed oil | 147 |
| Stannic chloride | 1.8 |

After 3½ hours of refluxing while the temperature is raised to a maximum of 210° C., there are obtained 39 parts of aqueous distillate, 74 parts of uncombined terpene and about 395 parts of a plastic, oxygen-convertible resin having an acid number of 25.8.

Example 10

| | Parts by weight |
|---|---|
| Dipentene | 125 |
| Fumaric acid | 78 |
| Ethylene glycol | 42 |
| Stannic chloride | 1.2 |

After 5 hours of refluxing during which the temperature reaches a maximum of 195° C., there are obtained 27 parts of aqueous distillate, 46 parts of uncombined terpene and about 173 parts of a hard resin having an acid number of 64.2.

Example 11

| | Parts by weight |
|---|---|
| Dipentene | 100 |
| Glycerol alpha monophenyl ether | 47 |
| Fumaric acid | 33 |
| Stannic chloride | 0.5 |

After 5½ hours refluxing at 180°–190° C., there are obtained 9.5 parts of aqueous distillate, 76 parts of uncombined terpene and about 95 parts of a hard resin having an acid number of 47.4.

Example 12

| | Parts by weight |
|---|---|
| Dipentene | 100 |
| Glycerol alpha monomethyl ether | 53 |
| Fumaric acid | 58 |
| Stannic chloride | 1 |

After 3½ hours of refluxing at 180°–190° C., there are obtained 25 parts of aqueous distillate, 57 parts of uncombined terpene and about 130 parts of a hard ester resin.

Example 13

| | Parts by weight |
|---|---|
| Alpha pinene | 150 |
| Triethylene glycol | 100 |
| Fumaric acid | 78 |

After 5½ hours refluxing at 160°–169° C., there are obtained 22 parts of aqueous distillate, 105 parts of uncombined terpene and about 201 parts of a viscous balsam-like product having an acid number of 49.

Example 14

| | Parts by weight |
|---|---|
| Alpha pinene | 150 |
| Triethylene glycol | 100 |
| Fumaric acid | 78 |
| Stannic chloride | 1.2 |

After 3 hours refluxing at 180°–200° C., there are obtained 24 parts of aqueous distillate, 28 parts of uncombined terpene and about 277 parts of a viscous balsam having an acid number of 53.1.

This product is found to be convertible to an infusible varnish-like film when its solutions in the monoethyl ether of ethylene glycol (Cellosolve) are applied to metal and stoved at 140° C. for ¾ hour. The hardness of these films is considerably increased when the solutions are admixed with small amounts of cobalt naphthenate.

Example 15

| | Parts by weight |
|---|---|
| Commercial octadecanediol containing 10–15% stearyl alcohol | 158 |
| Fumaric acid | 58 |
| Alpha pinene | 100 |
| Stannic chloride | 1 |

After 8½ hours refluxing at 176°–210° C., there are obtained 16 parts of aqueous distillate, 51 parts of uncombined terpene and about 250 parts of a balsam having an acid number of 12.8.

Example 16

| | Parts by weight |
|---|---|
| Alpha pinene | 125 |
| Amyl alcohol ("Pentasol") | 250 |
| Fumaric acid | 78 |
| Stannic chloride | 3 |

After 12½ hours of refluxing beginning at 125° C. and ending at 210° C., there are recovered 25 parts of aqueous distillate and 159 parts of a mixture of unreacted alcohol and terpene. The residual product from this distillation is fractionated at 2 millimeters of mercury pressure and 243 parts yield products of the following boiling range:

1. 17 parts = 7.0% boiling at less than 130° C.
2. 85 parts = 35.0% boiling at 130° C. to 180° C.
3. 108 parts = 44.4% boiling at 180° C. to 190° C.
4. 33 parts = 13.6% liquid residue.

Total 243 parts = 100.0%

Upon neutralization and repeated fractionation there are obtained from these original fractions, liquid esters as follows:

| Fraction | Boiling range at 1mm. | Density 25/25° C. | Ref. index 25° C. |
|---|---|---|---|
| | °C. | | |
| A | 130–140 | 0.9622 | 1.4507 |
| B | 190–200 | 0.9893 | 1.4678 |
| C | Over 200 | 0.9939 | 1.4740 |

Example 17

| | Parts by weight |
|---|---|
| Dipentene | 612 |
| n-Butanol | 500 |
| Fumaric acid | 348 |
| Stannic chloride-dioxanate | 16.2 |
| | 1,476.2 |

This is reacted for 18.5 hours under the conditions described in Example 16, beginning at 120° C. and gradually increasing to 195° C. as the water of esterification is eliminated. When the reaction product is distilled at between 1-2 mm. (mercury) pressure, 115 parts of aqueous distillate is first given off and the following additional fractions are obtained:

| Fraction | Boiling range 1-2 mm. | Yield |
|---|---|---|
| | | Parts by weight |
| (a) | Less than 100° C | 227 |
| (b) | 100°-120° C | 60 |
| (c) | 120°-150° C | 70 |
| (d) | 150°-170° C | 110 |
| (e) | 170°-190° C | 375 |
| (f) | 190°-200° C | 321 |
| (g) | 200°-205° C | 140 |
| (h) | Undistilled residue | 39 |
| | | 1,342 |

Redistillation of fractions (b) to (g), inclusive, gives the following:

| Fraction | Boiling range at 1 mm. | Yield |
|---|---|---|
| | | Parts by weight |
| 1 | Below 110° C | 15 |
| 2 | 110°-113° C | 109 |
| 3 | 113°-160° C | 119 |
| 4 | 160°-170° C | 445 |
| 5 | 170°-180° C | 246 |
| 6 | 180°-185° C | 96 |
| 7 | Undistilled residue | 40 |
| | | 1,070 |

Fractions 4 to 6, inclusive, were found on analysis to contain the terpene adducts, and the following constants were found:

| Fraction | Density 24°/15.5° C. | Refractive index 24° C. | Acid No. |
|---|---|---|---|
| 4 | 1.0056 | 1.4764 | 14.1 |
| 5 | 1.0069 | 1.4787 | 6.8 |
| 6 | 1.0050 | 1.4806 | 2.8 |

The stannic chloride-dioxanate catalyst used in this example is prepared by agitation of a mixture of 350 parts by weight of dioxane with 250 parts by weight of petroleum ether to which are slowly added 461 parts by weight of anhydrous stannic chloride in 100 parts of petroleum ether. The reaction is exothermic and should be kept below 30° C. by cooling. After the reaction has been effected, the product crystallizes from solution upon cooling and is recovered as a white solid which is stable at room temperature in air. This product is particularly well suited as a catalyst for the purposes of this invention.

*Example 18*

Parts by weight
Beta pinene _____ 170
Glycerol _____ 32
Triethylene glycol _____ 78
Fumaric acid _____ 116
Stannic chloride-dioxanate _____ 5

After 1¾ hours refluxing at 190° C., 58 parts by weight of uncombined terpene is removed by vacuum distillation and the resinous product remaining is a plastic solid which is soluble in toluene.

*Example 19*

Parts by weight
Fumaric acid _____ 116
Triethylene glycol _____ 142
Glycerol _____ 4
Beta pinene _____ 170
Stannic chloride-dioxanate _____ 3

A mixture containing these ingredients is heated to 180° C. in about one hour, to 210° C. in two hours, and then to 230° C. in a half hour. About 1 mol of terpene combines with 1 mol of fumaric acid. The acid number is about 13-19. A 60% solution in mineral spirits has viscosity F and color 6-7 (Gardner-Holdt scales).

This resin at a ratio of 5 parts to 1 part of ½ second viscosity nitrocellulose dissolved in a suitable solvent gave films which air-dried tack free. 2:1 mixtures are suitable as flexible adhesives.

*Example 20*

Parts by weight
Fumaric acid _____ 116
Triethylene glycol _____ 150
Beta pinene _____ 170
p-Toluene sulfonic acid _____ 2

This mixture is heated to 180° C. in about 45 minutes and to 200° C. in about 30 minutes. After removing the excess pinene by vacuum distillation, a light colored resin is obtained having about 1 mol of pinene combined per mol of fumaric acid.

*Example 21*

Parts by weight
Fumaric acid _____ 280
Glycerol _____ 260
Beta pinene _____ 328
p-Toluene sulfonic acid _____ 0.6

This composition is heated to 170° C. in about 75 minutes when the mixture becomes clear. After 1 hour at 170° C., the excess terpene is removed by distillation, leaving a product having about 1 mol of terpene combined per mol of fumaric acid. To about 583 parts of the product, a mixture containing about 292 parts of linseed oil acids and 262 parts of pinene is added. The temperature is raised to about 180°-190° C. in 1 hour and heating is continued in this range for about 7-8 hours. The excess of terpene is removed under vacuum and the residue dissolved in mineral spirits to form a 50% solution. The acid number of the resin is about 10, the color of the solution is about 4-5 and the viscosity of the solution is about N (Gardner-Holdt scales).

Films from a similar solution of viscosity L (Gardner-Holdt), containing 0.04% cobalt naphthenate (Nuodex) air dry dust-free in about 1 hour and tack-free in about 2 hours.

*Example 22*

Parts by weight
Fumaric acid _____ 232
Glycerol _____ 160
Beta pinene _____ 340
p-Toluene sulfonic acid _____ 0.4

This mixture is heated to 170° C. in about 45 minutes and the temperature maintained for about 30 minutes, or until clear. A mixture of 140 parts linseed oil acids and 160 parts beta pinene is preheated to 160° C. and added to the first mixture which is maintained at 170° C. This quantity of linseed oil acids is equivalent to about 20% of linseed oil. This is heated about 3 hours at 190°-200° C. Upon the further addition of about 140 parts of linseed oil, the concentration of oil combined with the resin is brought to about 35%.

If 900 parts of this product are dissolved in about 580 parts of mineral spirits, the resulting solution (containing about 50% of the poly-ester resin) has a viscosity about U and color about 5 (Gardner-Holdt scales). The resin has an acid number of about 35.

Example 23

| | Parts by weight |
|---|---|
| Fumaric acid | 232 |
| Glycerol | 180 |
| Beta pinene | 340 |
| p-Toluene sulfonic acid | 0.4 |

The reaction is carried out in the same manner as in Example 22, adding the same amounts of oil acids, oil, solvent, etc. The resulting resin has an acid number about 21 and the 50% solution, a viscosity of about Z3 about 4 Gardner-Holdt scales).

Example 24

| | Parts by weight |
|---|---|
| Fumaric acid | 116 |
| Glycerol | 90 |
| Beta pinene | 170 |
| p-Toluene sulfonic acid | 0.2 |

This composition is heated under an atmosphere of $CO_2$ to 170°-180° C. in about 2 hours, or until the solution is clear, and to this a mixture of 70 parts linseed oil acids and 80 parts of beta pinene, preheated to 160° C., is added. Heating is continued for about 2½ hours at 185°-190° C. 420 parts linseed oil at about 180° C. is then added to the mixture, the temperature raised to about 210° C. in about 1 hour, and maintained at 210° to 220° C. for about 1½ hours. A resin having an acid number about 9-10 is obtained. 800 parts of the product are mixed with about 670 parts of mineral spirits to give a 50% solution. This solution has a viscosity about E and color about 3 (Gardner-Holdt scales). When a higher viscosity is desirable, the resin may be reacted longer.

Example 25

| | Parts by weight |
|---|---|
| Fumaric acid | 116 |
| Glycerol | 80 |
| Beta pinene | 170 |
| p-Toluene sulfonic acid | 0.2 |

The above composition is heated to 210° C. in about 15 minutes and this temperature maintained for about 75 minutes. A mixture of 70 parts soya bean fatty acids and 80 parts beta pinene is added. The mixture is heated for about 4 hours at 190°-195° C. and the excess terpene removed under vacuum. About 0.9 mol of terpene per mol of fumaric acid was found to have combined. A pale yellow, hard solid having some cold flow, with an acid number about 39.0 is obtained. The softening point by the ring and ball method is about 77° C. This resin is suitable for cooking with oils for varnish manufacture.

Example 26

| | Parts by weight |
|---|---|
| Fumaric acid | 58 |
| Glycerol | 50 |
| Benzoic acid | 61 |
| Dipentene | 125 |
| Stannic chloride | 1 |

This mixture is heated about 3 hours at about 180° C., the resulting resin having about 1.1 mols of dipentene per mol of fumaric acid combined.

Example 27

| | Parts by weight |
|---|---|
| Fumaric acid | 58 |
| Glycerol (95%) | 47 |
| Dipentene | 100 |
| Rosin | 150 |
| Stannic chloride-dioxanate | 1.35 |

The mixture is heated to about 140° C. in about 20 minutes, then to 190° C. in about 1 hour and maintained at 190°-200° C. for about 45 minutes. A hard, somewhat brittle product is obtained.

Example 28

| | Parts by weight |
|---|---|
| Fumaric acid | 58 |
| Glycerol | 48 |
| Beta pinene | 85 |
| Stannic chloride-dioxanate | 2.7 |

This composition is heated to about 170°-185° C. in about 1½ hours. The heating is continued until the mixture clears, and then about 150 parts of rosin are added. After heating for about 1 hour at 180° C., a hard resin is obtained.

Example 29

| | Parts by weight |
|---|---|
| Fumaric acid | 116 |
| Mannitol | 182 |
| Beta pinene | 170 |
| Stannic chloride-dioxanate | 5 |

The mixture is heated to about 170° C. in about 3 hours and the temperature maintained for about 1 hour. A clear, somewhat brittle, red-brown resin is obtained.

Example 30

| | Parts by weight |
|---|---|
| Fumaric acid | 116 |
| Polyglycerol (acetyl number=1070) | 214 |
| Beta pinene | 170 |
| Stannic chloride-dioxanate | 5 |

This mixture is heated to about 155° C. in about 1½ hours and then heated about 2 hours at about 160° C. A rubbery, relatively dark resin was produced having about 0.6 mol of terpene per mol of fumaric acid combined.

Example 31

| | Parts by weight |
|---|---|
| Fumaric acid | 93 |
| Sebacic acid (grade A) | 40 |
| Glycerol | 80 |
| Beta pinene | 135 |
| p-Toluene sulfonic acid | 0.16 |

This composition is heated to about 170° C. in about 1 hour and then at about 185° C. for about 2 hours. A flexible type of resin is obtained.

The examples set forth above show typical methods of simultaneously reacting fumaric acid, a non-conjugated terpene of the $C_{10}H_{16}$ series and a reactive solubilizing alcohol to obtain a wide variety of alkyd-poly-esters. Some of the examples show the use of representative modifying agents, e. g. drying oil acids and drying oils.

Characteristic of the products of this invention is the substantial absence of esters of acids having a polybasicity greater than two, wherefore the viscosities and softening points tend to be lower than the maleic-terpene esters of the prior art. Fractionation of the butyl and amyl esters of the terpene-fumaric adducts of the present invention has also shown that far larger proportions of these are distillable than in the case of the butyl and amyl esters of the two stage maleic-terpene adducts. These differences may be attributable to the absence of such substantial amounts of polymeric acids as have been found to characterize the terpene-maleic adducts of the prior art.

By suitable regulation of the reaction conditions we may vary the combining ratio of terpene to fumaric acid and consequently of the proportion the various esters produced within considerable limits and by varying the solubilizing and reactive alcohols used we can produce a large number of new and useful derivatives.

The reactive solubilizing alcohols suitable for the practice of this invention are those which contain non-acidic primary or secondary hydroxyl groups and which are generally capable of esterification. It has been found possible also to employ other compounds of an alcoholic nature, such as the polyglycols, polyglycerols, mono aryl or alkyl ethers of glycerol, and the like. Various mixtures of alcohols may be used, especially mixtures of alcohols containing different numbers of hydroxyl groups, e. g., a monohydric alcohol with a dihydric alcohol, a monohydric or dihydric alcohol with a higher polyhdric alcohol such as glycerol, etc.

Monohydric alcohols yield, in general, analogous but liquid esters of varying boiling range while the polyhydric alcohols generally yield balsam-like or solid resins.

The higher polyhydric alcohols, i. e., those containing three or more hydroxyl groups, tend to react with the fumaric acid to yield insoluble gels without effecting sufficient combination of the terpenes. This tendency may be largely overcome by the use of an excess of the alcohol, by the use of suitable catalyst, and by carefully controlling the temperature to avoid overheating, particularly in the early stage of the reaction. The temperature should be raised only very slowly to about 170°–180° C. After the reaction has proceeded until the mixture is clear, the reaction temperature may be raised to 180°–200° C. With the higher temperatures, however, premature gelation is most likely to occur.

In order to obtain products of particular commercial utility, we have found it desirable to modify some of the compositions, and especially the glycerol-fumaric-terpene products in various ways in order to obtain resins having certain desirable properties. In general our terpene esters are more readily soluble in hydrocarbons than the phthalate types of alkyd resins. By slight modification of our resins it is possible to obtain resins having a high degree of oil solubility, quick air-drying properties, etc. One way of obtaining improved oil soluble resins is to incorporate small amounts of fatty oil acids in the composition after the initial reaction of the mixture including an alcohol (e. g. glycerol), terpene, and fumaric acid.

After this initial reaction has taken place, i. e. when the reaction mixture becomes clear, about 20% or more of fatty oil acids (calculated as triglyceride), e. g. linseed oil acids, are added to the mixture. It is especially important that the fumaric acid and terpene should be combined before the addition of any conjugated fatty oil acids in order to avoid reaction between the fumaric acid and the conjugated fatty oil acids before the terpene has had sufficient time to combine. It has been found advantageous in some cases to preheat the fatty oil acids before adding to the reaction mixture.

If more than about 20% of fatty oil be desired in the final product, it may be added during the latter stages of reaction in the form of either fatty oil acids or as the oil itself, as desired. Since the oil is less expensive than the acids it will usually be preferable to add the oil itself rather than the acids. The addition of about 20% of fatty oil acids (calculated as triglyceride) in the early stage of the reaction causes the composition to become miscible with additional oil after suitable reaction. Accordingly large amounts of the corresponding fatty oil or other fatty oils may be added to the composition if the temperature be kept relatively high, e. g. about 170° C.

When the resin is to be modified with fatty oil acids, additional alcohol, equivalent to the fatty oil acids to be added is usually added to the original mixture of fumaric acid, terpene and alcohol.

Our resins may be modified with any of the fatty oils. Examples of suitable fatty oils are: tung, soya bean, perilla, rapeseed, cottonseed, olein, stearin, etc. It may be desirable to modify the resin with drying oil acids and a drying oil, particularly if the resin is to be used in air-drying coating compositions. For this purpose we have found that linseed oil and linseed oil fatty acids are especially suitable. The term "drying oil" is intended to include semi-drying oils as well as the strictly drying oils. Obviously various mixtures of fatty oils or fatty oil acids may be used. The resins produced by modification with fatty oils are usually quite soluble in hydrocarbon solvents. They are, therefore, particularly suitable for use in varnishes, lacquers, etc.

Another way in which the compositions of our invention may be modified in order to obtain oil soluble products is by the addition of such substances as rosin acids, benzoic acid, etc., to the reaction mixture. If a conjugated compound such as rosin be used, this addition is preferably after all, or nearly all, of the terpene has combined with the fumaric acid as otherwise the modifying substance may combine with the fumaric before the latter has time to combine with the terpene.

In operating our process, we have found it advisable, although not essential, to employ sufficient excess of the terpene over the combining equivalent for the fumaric acid so that this excess of terpene, during its volatilization, may act mechanically and perhaps azeotropically to assist in the removal of the water of esterification and so promote the esterification reaction. When operating in this manner, the reaction vessel is best equipped with some suitable means such as a side arm to which is attached a reflux condenser and a water trap so that the condensing vapors may be separated continuously, the water retained or separated and the excess terpene returned to the system until the desired degrees of addition reaction and of esterification have been attained.

In the operation of our process, it is sometimes possible and advantageous to employ inert volatile diluents for the reaction mixture. Among materials suitable for this purpose may be mentioned benzene, toluene, xylene, ethylene dichloride or the like in place of an excess of terpene.

We have also found it possible to substitute a part of our terpenes with a corresponding amount of reactive non-terpene hydrocarbons and other volatile and polymerizable unsaturated bodies as, for example, styrene, dicyclopentadiene, cumarone and indene and certain vinyl, acrylic and methacrylic esters.

In the operation of this process, it has been found somewhat difficult to combine more than an average of ½ mol of terpene to each mol of fumaric acid unless a suitable catalyst be employed, although by the use of a large excess of terpene and by particular selection of the terpenes used, it has been found possible to exceed this combining ratio. In general, however, when higher ratios of combined terpene are required, we prefer to use a catalyst. Suitable catalysts are included in the group of the halogens, hydrogen halides or metallic halides and the use of such compounds is illustrated in some of the examples. Of the various substances which have been found to catalyze these reactions, stannic chloride or stannic chloride-dioxanate are particularly suitable. Other acidic catalysts could be substituted and among these we have found the sulfonic acids particularly suitable, e. g., p-toluene sulfonic acid.

When dihydric alcohols are used in practicing our invention, we prefer to employ only the theoretical equivalent of alcohol based on the amount of fumaric acid used, although the use of lesser or greater amounts is permissible. If monohydric alcohols or those containing more than two hydroxyl groups are used, then we usually prefer to use an excess of the alcohol. An excess of about 20% has been found suitable when glycerol is used. The amount of alcohol used depends somewhat on the properties desired in the resulting resin.

Terpenes suitable for the purpose of this invention are limited to those of the $C_{10}H_{16}$ series which are of non-conjugated structure and among which alpha and beta pinenes, the limonenes, dipentene, and terpinolene are particularly suitable. It is found possible to use gum turpentine or steam distilled wood turpentine in place of alpha pinene or of other non-conjugated terpenes with entirely satisfactory results. The use of turpentine or of other distillates rich in pinene is especially advantageous for economic reasons.

The products of this invention have been found to possess great utility. The liquid esters derived from the monohydric alcohols and the hydrogenated modifications of such esters have been found suitable for use as plasticizers for nitrocellulose and in certain cases, for ethyl cellulose or for other cellulose esters or ethers. Our poly-esters have also been found to be useful resins or resinous plasticizers for cellulose derivatives, particularly nitrocellulose. Many of the poly-esters, with or without fatty acid or drying oil modification, have been found to be oxygen-convertible and of considerable utility in air-drying or in stoving paints, varnishes and enamels.

Certain of the products such as those prepared in accordance with Examples 7 and 8 have been found to yield superior binders for linoleum and related plastics. Products of the present invention are also useful for printing or lithographing inks, gaskets, cements or adhesives and for general coating or impregnating purposes.

Such other suitable changes and variations may be made in carrying out our process without departing from the spirit and scope of our invention as defined in the appended claims.

We claim:

1. A process for the production of ester condensation products which comprises heating to reaction temperatures a mixture containing fumaric acid, a non-conjugated terpene of the $C_{10}H_{16}$ series and a reactive solubilizing alcohol.

2. A process for the production of ester condensation products which comprises heating to reaction temperatures a mixture containing fumaric acid, a non-conjugated terpene of the $C_{10}H_{16}$ series and a reactive solubilizing alcohol, the temperature, time and other conditions being such as to bring about free and relatively continuous volatilization and removal of water of condensation in admixture with unreacted terpene.

3. A process for the production of ester condensation products which comprises heating to reaction temperatures a mixture containing fumaric acid, a non-conjugated terpene of the $C_{10}H_{16}$ series and a reactive solubilizing alcohol, the temperature, time and other conditions of reaction being such as to bring about free and relatively continuous volatilization and removal of water of condensation in admixture with unreacted terpene, separating the water from the admixture and returning the terpene to the reaction.

4. A process for the production of ester condensation products which comprises heating a mixture containing fumaric acid, a reactive solubilizing alcohol and a terpene distillate, the major portion of which consists of non-conjugated terpenes of the $C_{10}H_{16}$ series, said heating being continued at a temperature and for a time sufficient to bring about chemical combination of the mixture.

5. A process for the production of ester condensation products which comprises heating to reaction temperatures a mixture containing fumaric acid, a reactive solubilizing alcohol, and a non-conjugated terpene of the $C_{10}H_{16}$ series in the presence of a catalyst selected from the group consisting of halogens, hydrogen halides, metal halides, and sulfonic acids.

6. The process of claim 5 wherein the substance which catalyzes the reaction is p-toluene sulfonic acid.

7. The process of claim 5 wherein the substance which catalyzes the reaction is stannic chloride-dioxanate.

8. The process of claim 5 wherein the alcohol is glycerol.

9. A process for the production of ester condensation products which comprises heating to reaction temperatures a mixture containing fumaric acid, a non-conjugated terpene of the $C_{10}H_{16}$ series and a reactive solubilizing alcohol in the presence of a catalyst selected from the group consisting of halogens, hydrogen halides, metal halides, and sulfonic acids, continuing said heating until the reaction mixture becomes clear, adding fatty oil acids and continuing said heating until a homogeneous product is obtained.

10. The process of claim 9 wherein the alcohol is glycerol.

11. The process of claim 9 wherein the fatty oil acids are linseed oil acids.

12. A process for the production of ester condensation products which comprises heating to reaction temperatures a mixture containing fumaric acid, a non-conjugated terpene of the $C_{10}H_{16}$ series, and a reactive solubilizing alcohol in the presence of a catalyst selected from the group consisting of halogens, hydrogen halides, metal halides, and sulfonic acids, continuing said heating until the reaction mixture becomes clear, adding a mixture containing fatty oil acids and a solvent therefor to the reaction mixture and continuing heating until a homogeneous product is obtained.

13. A process for the production of ester condensation products which comprises heating to reaction temperature a mixture containing fumaric acid, a non-conjugated terpene of the $C_{10}H_{16}$ series, and a reactive solubilizing alcohol in the presence of a catalyst selected from the group consisting of halogens, hydrogen halides, metal halides, and sulfonic acids, continuing said heating until the reaction mixture becomes clear, adding a mixture containing fatty oil acids and a solvent therefor to the reaction mixture, continuing said heating until the reaction mixture is homogeneous and subsequently mixing therewith a fatty oil.

14. A process for the production of ester condensation products which comprises heating to reaction temperatures a mixture containing fumaric acid, a non-conjugated terpene of the $C_{10}H_{16}$ series and glycerol in the presence of a catalyst selected from the group consisting of halogens, hydrogen halides, metal halides, and sulfonic acids, continuing said heating until the reaction mixture becomes clear, adding rosin, and continuing said heating to give a homogeneous product.

15. A process for the production of ester condensation products which comprises heating to reaction temperatures a mixture containing fumaric acid, benzoic acid, a non-conjugated terpene of the $C_{10}H_{16}$ series and glycerol in the presence of a catalyst selected from the group consisting of halogens, hydrogen halides, metal halides, and sulfonic acids.

16. A composition of matter comprising essentially a simultaneous reaction product of a mixture containing fumaric acid, a non-conjugated terpene of the $C_{10}H_{16}$ series and glycerol.

17. A composition of matter comprising essentially a simultaneous reaction product of fumaric acid, a non-conjugated terpene of the $C_{10}H_{16}$ series and an alcohol.

18. A composition of matter comprising essentially a simultaneous reaction product of fumaric acid, pinene and an alcohol.

19. A composition of matter comprising essentially fatty acids derived from a natural glyceride ester combined with the simultaneous reaction product of a mixture containing fumaric acid, a non-conjugated terpene of the $C_{10}H_{16}$ series and an alcohol.

20. A composition of matter comprising essentially a simultaneous reaction product of a mixture containing fumaric acid, glycerol and a terpene distillate, the major portion of which consists of pinene, modified with at least one substance selected from the group consisting of linseed oil fatty acids and linseed oil.

THEODORE F. BRADLEY.
WILLIAM B. JOHNSTON.

CERTIFICATE OF CORRECTION.

Patent No. 2,234,958.                                      March 18, 1941.

THEODORE F. BRADLEY, ET AL.

It is hereby certified that error appears in the printed specification of the above numbered patent requiring correction as follows: Page 3, first column, line 39, for "terpene" read --terpenes--; page 5, first column, line 25, for "about 4 Gardner-Holdt" read --and color about 4 (Gardner-Holdt--; page 6, first column, line 13, for "terpene-furmaric" read --terpene-fumaric--; line 40, for "polyhdric" read --polyhydric--; and that the said Letters Patent should be read with this correction therein that the same may conform to the record of the case in the Patent Office.

Signed and sealed this 8th day of April, A. D. 1941.

(Seal)                                                  Henry Van Arsdale,
                                                       Acting Commissioner of Patents.